Feb. 2, 1965
C. M. BARUT ETAL      3,168,375
PROCESS FOR THE TREATMENT OF AN AQUEOUS SOLUTION CONTAINING
VARIOUS METAL SULPHATE SALTS FOR THE RECOVERY OF METAL
VALUES, PARTICULARLY OF COBALT, THEREFROM
Filed Aug. 28, 1962
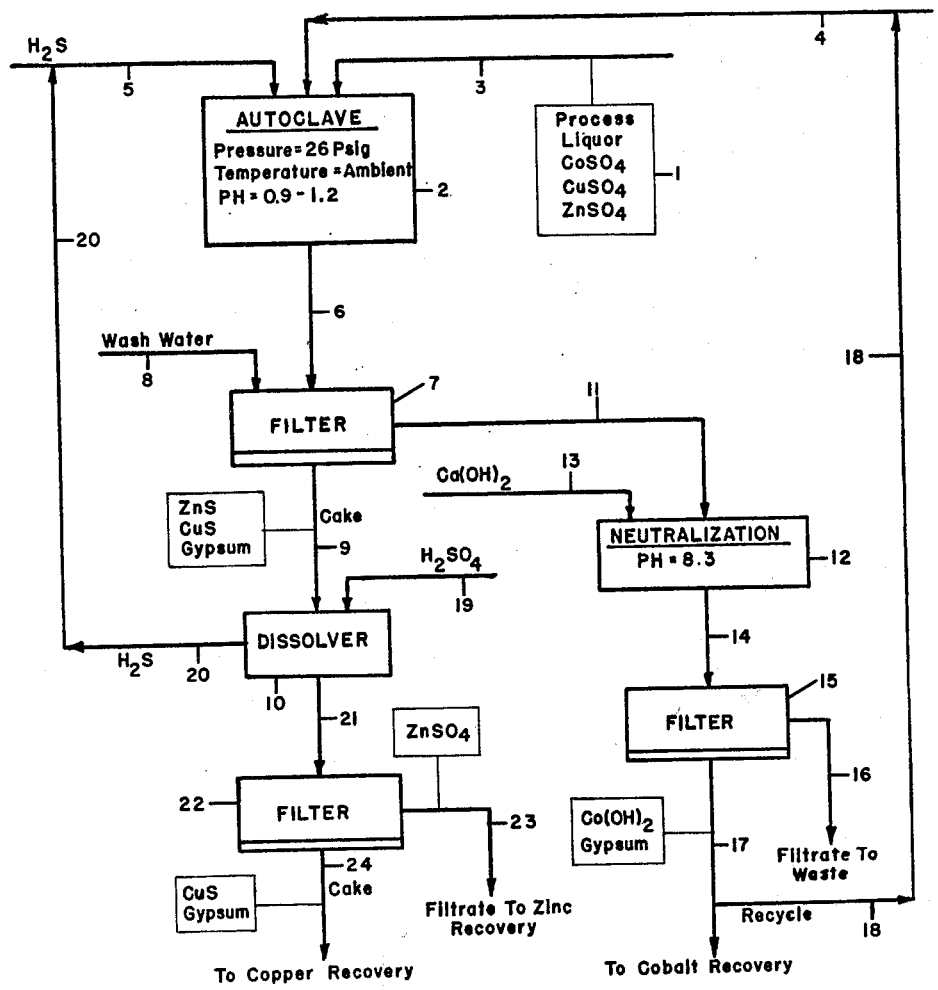
*INVENTORS*
*Cihat M. Barut*
*Raymond O. Lehr*

3,168,375
PROCESS FOR THE TREATMENT OF AN AQUEOUS SOLUTION CONTAINING VARIOUS METAL SULPHATE SALTS FOR THE RECOVERY OF METAL VALUES, PARTICULARLY OF COBALT, THEREFROM
Cihat M. Barut, New York, N.Y., and Raymond O. Lehr, Westport, Conn., assignors to Dorr-Oliver Incorporated, Stamford, Conn., a corporation of Delaware
Filed Aug. 28, 1962, Ser. No. 219,964
11 Claims. (Cl. 23—135)

This invention relates to improved process for recovering metal values from ores or analagous materials and more particularly to a process for the selective recovery of cobalt values from an aqueous solution thereof.

Cobalt is a very important and critical chemical material. The amounts of this metal which occur in nature are relatively small, therefore, whenever this metal occurs in an ore, industrial by-products, or chemical and metallurgical process liquors attempts are made to recover this essential element.

The methods which have heretofore been proposed for recovering this metal vary, in general, with the nature of the starting material. However, in general, these processes leave much to be desired from the commercial point of view, especially as to the recovery of this metal free from impurities. The art is, therefore, confronted with the problem of recovering cobalt values from these materials in an economical and commercially acceptable manner.

It is, therefore, an object of this invention to provide a process for the recovery of cobalt values contained in an aqueous solution in an efficient and economical manner.

It is another object of this invention to provide a process for recovering cobalt values from an aqueous solution substantially free from other metals.

The separation and recovery of cobalt values from aqueous solutions is further complicated when said solution contains excess amounts of zinc. The prior art methods of separating zinc from the aqueous solution involve complex reactions which generally yield incomplete separation of ions.

It is, therefore, another object of the present invention to recover cobalt from a solution high in zinc values.

It is a further object of this invention to provide a process for recovering metal constituents from aqueous solutions which will lend themselves to further processing to obtain the free metals.

It has been found, in accordance with the present invention, that cobalt can be recovered in a highly efficient and economical manner from an aqueous cobalt solution containing zinc and other metal constituents by reacting said solution with hydrogen sulphide gas at a pressure within the range of 20–30 pounds per square inch gauge and at a pH maintained within the narrow range of 0.9 to 1.2. The liquors resulting from this reaction are amenable to the extraction of cobalt either in the form of pure metal or pure cobalt compounds.

In order that this invention may be readily carried into effect this invention will now be described with reference to the accompanying diagrammatic drawing which illustrates the preferred embodiment of this invention.

Referring to the drawing, an aqueous solution, such as copper tankhouse process liquors containing essentially cobalt sulphate, copper sulphate and zinc sulphate, is introduced into an autoclave 2 via line 3 and adjusted to a pH in the range of 0.9 to 1.2, preferably, by adding previously precipitated cobaltous hydroxide via line 4. The resulting mixture is then reacted with hydrogen sulphide gas introduced via line 5 under a pressure of about 20 to 30 pounds per square inch gauge, preferably at 25 p.s.i.g., at room temperature. This pressure is maintained until the reaction reaches equilibrium. Under the aforesaid conditions, copper and zinc sulphate precipitates as the sulphides but cobalt remains in solution as cobalt sulphate.

Since the conversion of copper and zinc sulphate to the sulphides is accompanied by the formation of sulphuric acid, it is essential that the reaction mixture be constantly checked to maintain the pH within the aforesaid range. Any of the conventional methods of determining and controlling pH may be employed. These methods may be either automatic or manual.

The contents of the autoclave are conducted via line 6 to a filter 7, preferably a pressure filter, wherein the cobalt sulphate solution is separated from the precipitated copper and zinc sulphide. The filter cake, prior to removal from the filter, is washed, with wash water introduced via line 8 to remove residual aqueous cobalt solution remaining in the cake and then conducted via line 9 to a dissolving station 10 for further treatment.

The filtrate, comprising aqueous cobalt sulphate in reaction liquors, is conducted via line 11 to a neutralization station 12 where the pH of the liquor is raised to about 8.3 by adding an alkali, preferably calcium hydroxide, via line 13 to precipitate cobaltous hydroxide and gypsum. This mixture is conducted to a filter 15 via line 14, such as a rotary drum filter, wherein a filter cake comprising cobaltous hydroxide and gypsum is formed.

The filtrate from this filtering operation is discarded to waste via line 16. The filter cake is removed and conducted to a cobalt recovery circuit via line 17.

A portion of the freshly precipitated cobaltous hydroxide and gypsum is preferably removed via line 18 and recycled to the autoclave 2 via line 4 to act as a pH control. The gypsum which is recycled acts as a filter aid in filtration station 7.

Reverting to the dissolving station 10, the filter cake, formed on filter 7 and conducted to the dissolving station 10 via line 9, comprises precipitated zinc sulphide and copper sulphide and gypsum, which was recycled to the autoclave 2 with the cobaltous hydroxide as heretofore described.

The filter cake in dissolving station 10 is reacted with sulphuric acid via line 19 whereby the zinc sulphide is converted to zinc sulphate with the generation of hydrogen sulphide gas. The regenerated hydrogen sulphide may be removed via line 20 and reused in the autoclave 2 via line 5 as heretofore described.

The reaction mixture is conducted via line 21 to a filter 22 such as a rotary drum filter, wherein the aqueous zinc sulphate is separated from the remaining copper sulphide and gypsum. The filtrate comprising zinc sulphate is removed via line 23 and conducted to a zinc recovery station, the filter cake, comprising copper sulphide and gypsum, is removed from the filter drum and conducted via line 24 to a copper recovery station.

In the method of the present invention it was found that improved filtration of the zinc and copper sulphide was obtained if a residual amount of the reaction mixture of the preceding reaction was retained in the autoclave during the subsequent reaction. It is believed that the precipitated zinc and copper sulphide crystals act as nuclei during the subsequent precipitation thereby forming large crystals which filter rapidly.

One of the features of the present invention is that, preferably, the alkali added to the neutralization station 12 forms a precipitate which may act as a filter aid in the filtration station 7.

This invention will be better understood from a consideration of the following examples which, however, is not limited thereto:

Example I

A solution was prepared to correspond to a typical copper tankhouse discard liquor, using the sulphate salts of cobalt, copper and zinc. Upon analysis, the solution was found to contain

|   | Grams per liter |
|---|---|
| Cobalt | 4.7 |
| Copper | 0.24 |
| Zinc | 12.9 |

To one liter of the above liquor, 2.90 grams of cobalt, as freshly precipitated cobaltous hydroxide was added in a stainless steel container and thoroughly mixed.

The container was placed in an autoclave and hydrogen sulphide was applied under a pressure of 25 p.s.i.g. for a period of two and a half hours with constant agitation. The autoclave was maintained at room temperature.

The pH at the completion of the reaction was recorded as 1.00. The product of the reaction was filtered and washed. The results are reported as follows:

|   | Ccs. or grs. | Co, g.p.l. or percent | Co, grs. | Cu, g.p.l. or percent | Cu, grs. | Zn, g.p.l. or percent | Zn, grs. | Zn:Co Ratio |
|---|---|---|---|---|---|---|---|---|
| Feed solution to autoclave | 1,000 cc | 4.7 g.p.l. | 4.70 | 0.24 g.p.l. | 0.24 | 12.9 g.p.l. | 12.9 | 2.74:1 |
| Filtrate from reaction with washings | 1,405 cc | 5.4 g.p.l. | 7.60 | none | | 0.018 g.p.l. | 0.025 | 0.0033:1 |
| Filter cake from reaction | 24.1 gr | 0.39% | 0.094 | 0.35% | 0.085 | 51.9% | 12.50 | 133:1 |

Example II

Another solution substantially identical to the solution prepared in Example I was prepared and reacted under the conditions set out above except that the reaction was stopped after one and a half hours. The results were found to be substantially the same.

Example III

A solution was prepared to correspond to a typical copper tankhouse discard liquor using the sulphate salts of cobalt, copper and zinc. Upon analysis the solution was found to contain

|   | Grams per liter |
|---|---|
| Cobalt | 3.9 |
| Copper | 0.40 |
| Zinc | 12.1 |

To one liter of the above solution 4.0 grams of powdered magnesium oxide was added in a stainless steel container and thoroughly mixed. The container was placed in an autoclave and hydrogen sulphide was applied under a pressure of 26 p.s.i.g. for a period of 2.5 hours with constant agitation. The pH at completion of the reaction was recorded as 0.9. The products of the reaction were filtered and washed, the results are reported as follows:

|   | Ccs. or grs. | Co, g.p.l. or percent | Co, grs. | Cu, g.p.l. or percent | Cu, grs. | Zn, g.p.l. or percent | Zn, grs. | Zn:Co Ratio |
|---|---|---|---|---|---|---|---|---|
| Feed solution to autoclave | 995 cc | 3.9 g.p.l. | 3.88 | 0.40 g.p.l. | 0.39 | 12.1 g.p.l. | 12.1 | 3.08:1 |
| Filtrate from reaction with washings | 1,250 cc | 2.95 g.p.l. | 3.70 | | | 0.06 g.p.l. | 0.07 | 0.019:1 |
| Filter cake from reaction | 1,840 gr | 0.42% | 0.08 | 1.9% | 0.35 | 61.0% | 11.20 | 140:1 |

From the above examples applicants have shown a method of recovering cobalt substantially free of zinc impurities.

The method of the present invention possesses a number of important advantages in extracting metal values, particularly cobalt, from starting materials containing such values especially when substantially complete separation of these values from undesirable elements is desired.

The hydrogen sulphide used can be produced at reasonably low cost from sulphur and liquid petroleum gas. The hydrogen sulphide consumed by the zinc metal can be regenerated with dilute sulphuric acid and reused in the system, thereby reducing to a minimum the overall consumption of hydrogen sulphide in the process. The cobaltous hydroxide required for the pH control in the autoclave can be obtained by recycling part of the previously precipitated cobalt.

A still further advantage is that the calcium hydroxide added to the aqueous cobalt sulphate solution, after separation of copper and zinc sulphide, forms a gypsum precipitate which upon recycling to the autoclave acts as a filter aid in the subsequent filtration operation.

It is to be understood that suitable modifications to the teaching of this invention may be made without departing from the spirit thereof. For instance, calcium oxide, calcium carbonate and magnesium hydroxide may be used for controlling the pH of the process liquors in the autoclave.

Further, any alkali can be substituted for calcium hydroxide. Examples are calcium oxide, calcium carbonate and barium hydroxide.

It is also to be understood that in the present process the material may be put through continuously or in batches, or part of the flowsheet may be continuous and part of it in batches. For instance, the autoclave operation may be a batch-type operation. However, in the subsequent filtration operation the filter may be so sized so that the filtration operation is continuous.

From the foregoing description of the various embodiments of this invention, it is evident that the objects of this invention, together with many practical advantages, are successfully achieved. While the preferred embodiments of our invention have been described, numerous further modifications may be made without departing from the scope of the invention as defined by the appended claims.

Therefore, it is to be understood that all matters herein set forth as shown in the accompanying drawing are to be interpreted in an illustrative and not in a limiting sense.

We claim:

1. A process for treating an aqueous solution containing the sulphate salts of zinc and cobalt comprising the steps of, adjusting the pH value of the solution to within the range of 0.9 to 1.2, reacting said solution with hydrogen sulphide at a pressure within the range of 20 to 30 p.s.i.g., maintaining said solution within the aforesaid pH range during said reaction to precipitate zinc sulphide, and separating the thus precipitated zinc sulphide from the aqueous cobalt solution.

2. A process according to claim 1 wherein said reaction is carried out in the presence of previously precipitated zinc sulphide.

3. A process for treating an aqueous solution containing the sulphate salts of copper, zinc and cobalt comprising the steps of, adjusting the pH value of the solution to within the range of 0.9 to 1.2, reacting said solution with hydrogen sulphide at a pressure within the range of 20 to 30 p.s.i.g., maintaining said solution within the aforesaid pH range during said reaction to precipitate copper and zinc as sulphides, and separating the thus precipitated metal sulphides from the aqueous cobalt solution.

4. A process according to claim 3 wherein said reaction is carried out in the presence of previously precipitated zinc and copper sulphide.

5. A process for separately recovering metal values from an aqueous feed solution containing the sulphate salts of copper, zinc and cobalt which comprises the steps of, adjusting the pH value of the solution to within the range of 0.9 to 1.2, initially reacting said solution with hydrogen sulphide under a pressure of 20 to 30 p.s.i.g., maintaining said solution within the aforesaid pH range during said reaction to precipitate copper and zinc as sulphides, separating the thus precipitated metal sulphides from the remaining aqueous cobalt solution, subjecting the thus separated metal sulphide precipitate to treatment with sulphuric acid to convert zinc sulphide to zinc sulphate, separately recovering the thus formed zinc sulphate from the remaining precipitate, subjecting the previously separated aqueous cobalt solution to neutralization treatment to precipitate cobaltous hydroxide, and recovering the precipitated cobaltous hydroxide substantially free from impurities.

6. Process according to claim 5 wherein the hydrogen sulphide generated during the conversion of zinc sulphide to zinc sulphate is recycled into the process for further use.

7. Process according to claim 5 wherein the pH of said feed solution is controlled by recycling previously precipitated cobaltous hydroxide.

8. Process according to claim 5 wherein said initial reaction is carried out in the presence of previously precipitated copper and zinc sulphide.

9. Process according to claim 1 wherein the separated aqueous cobalt solution is subjected to neutralization treatment to precipitate cobaltous hydroxide, and separating the thus precipitated cobaltous hydroxide from the resulting aqueous solution.

10. A process for recovering cobalt from an aqueous feed solution containing the sulphate salts of zinc and cobalt which comprises the steps of, adjusting the pH value of the solution to within the range of 0.9 to 1.2, reacting said solution with hydrogen sulphide at a pressure within the range of 20 to 30 p.s.i.g., maintaining said solution within the aforesaid pH range during said reaction to precipitate zinc sulphide, filtering the precipitated zinc sulphide from the aqueous cobalt solution, subjecting said aqueous cobalt solution to neutralization treatment with calcium hydroxide to precipitate cobaltous hydroxide and gypsum, and recovering the thus precipitated cobaltous hydroxide and gypsum from the resulting aqueous solution.

11. Process according to claim 10 wherein previously precipitated gypsum acts as a filter aid during said filtering operation.

References Cited in the file of this patent
UNITED STATES PATENTS
2,950,172     Pincott _____ Aug. 23, 1960

OTHER REFERENCES

"Handbook of Chemistry," by N. A. Lange, 10th Edition, 1961, pages 961–963 inclusive. McGraw-Hill Book Co., Inc., N.Y.